US008019303B2

(12) United States Patent
Liu et al.

(10) Patent No.: US 8,019,303 B2
(45) Date of Patent: Sep. 13, 2011

(54) MULTI-ANTENNA MULTICARRIER RECEIVER AND METHODS FOR ADAPTIVELY ADJUSTING A RECEIVE DATA RATE BASED ON CHANNEL UTILIZATION

(75) Inventors: Changwen Liu, Portland, OR (US); Qinghua Li, Sunnyvale, CA (US); Robert J. Stacey, Portland, OR (US); Adrian P Stephens, Cottenham (GB)

(73) Assignee: Intel Corporation, Santa Clara, CA (US)

(*) Notice: Subject to any disclaimer, the term of this patent is extended or adjusted under 35 U.S.C. 154(b) by 2074 days.

(21) Appl. No.: 10/954,019

(22) Filed: Sep. 28, 2004

(65) Prior Publication Data

US 2006/0067443 A1 Mar. 30, 2006

(51) Int. Cl.
*H04B 7/00* (2006.01)
*H04W 72/00* (2009.01)

(52) U.S. Cl. .............. 455/277.1; 455/277.2; 455/450; 455/446; 455/455; 455/452.2; 370/395.41; 370/408

(58) Field of Classification Search .......... 455/450–455, 455/561; 370/329
See application file for complete search history.

(56) References Cited

U.S. PATENT DOCUMENTS

| 5,673,253 | A | * | 9/1997 | Shaffer | 370/229 |
| 5,694,396 | A | * | 12/1997 | Firouzbakht et al. | 370/480 |
| 7,062,246 | B2 | * | 6/2006 | Owen | 455/277.1 |
| 7,072,315 | B1 | * | 7/2006 | Liu et al. | 370/329 |
| 2005/0197147 | A1 | | 9/2005 | Stephens et al. | |
| 2006/0121946 | A1 | * | 6/2006 | Walton et al. | 455/561 |
| 2010/0099366 | A1 | * | 4/2010 | Sugar et al. | 455/75 |

OTHER PUBLICATIONS

Ebert, J.-P., et al., "Power Saving in Wireless LANs: Analyzing the RF Transmission Power and MAC Retransmission Trade-Off", *Proceedings, European Wireless '99 and ITG Fachtagung Mobile Kommunikation*, (1999), 187-192.

Guo, C., et al., "Protocol (MAC) Strategy for Adaptive Energy Saving Radio Design", *Berkeley Wireless Research Center (BWRC)*, (2000), 15 pgs.

Ramos, N., et al., "Energy-Efficient Link Adaptations in IEEE 802. 11b Wireless LAN", *Proceedings, Third IASTED International Conference on Wireless and Optical Communications (WOC 2003)*, (2003), 578-583.

Zhu, J., et al., "Leveraging Spatial Reuse in 802.11 Mesh Networks With Enhanced Physical Carrier Sensing", *IEEE International Conference on Communications (ICC 2004)*, vol. 7, (Jun. 2004), 4004-4011.

\* cited by examiner

*Primary Examiner* — Charles Appiah
*Assistant Examiner* — Emem Stephen
(74) *Attorney, Agent, or Firm* — Schwegman, Lundberg & Woessner, P.A.; Gregory J. Gorrie

(57) ABSTRACT

A multicarrier receiver changes receive capabilities based on a current channel utilization. The number of antennas used to receive multicarrier communication signals may be changed or the channel bandwidth may be changed.

17 Claims, 3 Drawing Sheets

MULTI-ANTENNA MULTICARRIER RECEIVER AND METHODS FOR ADAPTIVELY ADJUSTING A RECEIVE DATA RATE BASED ON CHANNEL UTILIZATION

TECHNICAL FIELD

Embodiments of the present invention pertain to wireless communications. Some embodiments pertain to multicarrier receivers, some embodiments pertain to wireless local area network (WLANs) and some embodiments pertain to network interface circuitry (NIC).

BACKGROUND

Some multicarrier receivers employ more than one antenna to receive multicarrier communication signals through a communication channel. The multiple antennas allow the receiver to receive at an increased data rate, may allow the receiver to operate under noisy channel conditions, and/or may allow the receiver to receive more than one spatial channel. One drawback to receiving with more than one antenna is that it consumes additional power. For each additional receive antenna, a multicarrier receiver may also have an additional low-noise amplifier, additional downconverter circuitry, an additional automatic-gain-control (AGC) amplifier, and an additional analog-to-digital converter. Furthermore, for each additional antenna that is operating, a multicarrier receiver performs digital signal processing operations on signals received by each antenna. The power consumed by this front-end circuitry and the subsequent processing operations associated with each antenna can be significant, especially for portable wireless communication devices that rely on batteries.

Thus, there are general needs for multicarrier receivers and methods for receiving multicarrier signals with reduced power consumption. There are also general needs for multicarrier receivers and methods for receiving multicarrier signals with reduced power consumption without a reduction in system performance.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
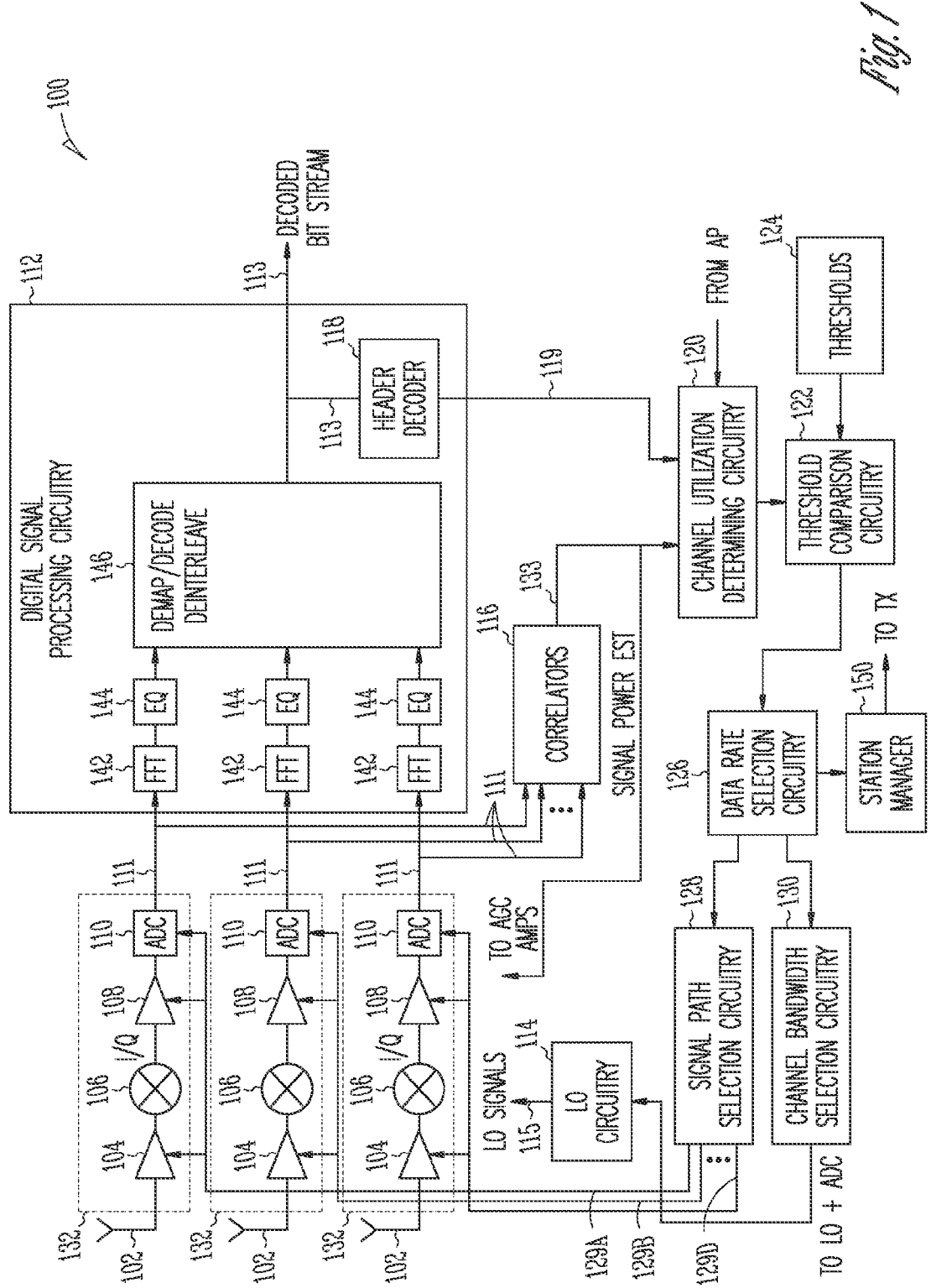
FIG. 1 is a block diagram of a multicarrier receiver in accordance with some embodiments of the present invention.

FIG. 1 is a block diagram of a multicarrier receiver in accordance with some embodiments of the present invention. Multicarrier receiver 100 receives multicarrier communication signals through a communication channel using one or more of antennas 102. In some embodiments, multicarrier receiver 100 may be referred to as a multiple input receiver and may be able to concurrently receive more than one data stream using antennas 102. In these embodiments, the number of receive antennas should be at least as great as the number of spatial data streams being received. Multicarrier receiver 100 generates decoded bit stream 113 from the multicarrier communication signals received through antennas 102.

In accordance with some embodiments, multicarrier receiver 100 determines a current channel utilization of the communication channel and may change its capability by either increasing or decreasing the number of antennas 102 used to receive signals through the communication channel based on the current channel utilization. In some embodiments, multicarrier receiver may change its capability by changing the channel bandwidth it receives. Power consumption may be reduced without a reduction in system performance.

Multicarrier receiver 100 includes signal-path front-end circuitry 132 associated with each receive antenna 102 (i.e., each chain). Signal-path front-end circuitry 132 for each signal path may include, for example, low-noise amplifier (LNA) 104, mixer 106, automatic-gain-control (AGC) amplifier 108, and analog-to-digital converter (ADC) 110. Signal-path front-end circuitry 132 may generate zero frequency in-phase (I) and quadrature phase (Q) signals 111 for processing by digital signal processing circuitry 112. In some embodiments, each mixer 106 may comprise an in-phase mixer element and a quadrature phase mixer element driven by corresponding in-phase and quadrature phase local oscillator signals 115 from local oscillator (LO) circuitry 114 to produce I and Q output signals.

Multicarrier receiver 100 may also include correlators 116 to perform correlations on signals 111 to determine, among other things, timing and frequency offset estimates for generating signal power estimate 133, among other things. In some embodiments, the gain of AGC amplifiers 108 may be responsive to signal power estimate 133.

Digital signal processing circuitry 112 may perform various processing operations on signals 111 to generate decoded bit stream 113. In some embodiments, digital signal processing circuitry 112 may include fast Fourier transform (FFT) circuitry 142 associated with each signal path to perform an FFT on signals 111, and digital filters 144 associated with each signal path to filter digital signals associated with a particular signal path. In some embodiments, digital filters 144 may include equalizers (EQ), although the scope of the invention is not limited in this respect. Digital signal processing circuitry 112 may also include circuitry 146 to perform demapping, decoding and deinterleaving operations to generate decoded bit stream 113.

Digital signal processing circuitry 112 may also include header decoder 118, which may decode headers of received packets. The decoded headers may indicate packet length, among other things. In some embodiments, header decoder 118 may decode physical-layer convergence protocol (PLCP) packet headers, although the scope of the invention is not limited in this respect.

Although FFT circuitry 142, digital filters 144, circuitry 146 and header decoder 118 are illustrated as separate functional elements, the functions of these elements may be performed by one or more digital signal processors (DSPs) or other processors that may perform these operations concurrently and/or sequentially.

Multicarrier receiver 100 may also include channel utilization determining circuitry 120 which may determine a current channel utilization of the communication channel. In some embodiments, channel utilization determining circuitry 120 may determine the current channel utilization based on signal power estimate 133. In some embodiments, channel utilization determining circuitry 120 may determine the current channel utilization based on packet lengths indicated by decoded headers 119 of packets received thorough the communication channel. In some embodiments, channel utilization determining circuitry 120 may determine the current channel utilization from information provided by another communication station. The determination of channel utilization is discussed in more detail below.

Multicarrier receiver 100 may also comprise receiver capability change circuitry 152 to change the receiver's capability based on the current channel utilization. Multicarrier receiver 100 may also comprise data rate selection circuitry 126 to select a receive data rate based on the receiver capability. In some embodiments, receiver capability change circuitry 152 may include signal path selection circuitry 128 to change a number of antennas used to receive multicarrier communication signals and/or channel bandwidth selection circuitry 130 to change a channel bandwidth for processing the multicarrier communication signals. In some embodiments, data rate selection circuitry 126 may determine what the receiver's capability should be changed to based on the current channel utilization, and receiver capability change circuitry 152 may implement the change.

Multicarrier receiver 100 may also comprise threshold comparison circuitry 122 to compare the current channel utilization with an upper channel utilization threshold and a lower channel utilization threshold. The lower and upper channel utilization thresholds may be stored in threshold storage element 124 and may be updated and changed based on performance requirements. In some embodiments, receiver capability change circuitry 152 may increase the receiver capability when the channel utilization exceeds an upper channel utilization threshold and may decrease the receiver capability when the channel utilization is below a lower channel utilization threshold. In some embodiments, signal path selection circuitry 128 may increase the number of antennas to be used when the receiver capability is increased and may decrease the number of antennas to be used when the receiver capability is decreased.

In some embodiments, channel utilization determining circuitry 120 may verify that the current channel utilization either exceeds the upper channel utilization threshold or falls below the lower channel utilization threshold for at least a predetermined period of time before receiver capability change circuitry 152 is instructed to change the receiver capability.

In some embodiments, signal path selection circuitry 128 may change the number of antennas by turning off at least some signal-path front-end circuitry 132 associated with a particular one or more of the antennas when the number of antennas is to be decreased. Signal-path front-end circuitry 132 that may be turned on or off may include LNA 104, AGC amplifier 108 and ADC 110 associated with the particular one or more of the antennas. As illustrated in FIG. 1, signal path selection circuitry 128 may generate control signal 129A to either turn on or turn off signal-path front-end circuitry 132 associated with a first antenna 102. Signal path selection circuitry 128 may also generate control signal 129B to either turn on or turn off signal-path front-end circuitry 132 associated with a second antenna 102. Signal path selection circuitry 128 may also generate control signal 129D to either turn on or turn off signal-path front-end circuitry 132 associated with a fourth or last antenna 102. Control signals 129A through 129D may also be used to control processing operations associated with signal paths in digital signal processing circuitry 112.

Signal path selection circuitry 128 may instruct digital signal processing circuitry 112 to refrain from performing processing operations associated with a signal path that is turned off. In some embodiments, digital signal processing circuitry 112 may refrain from performing processing operations associated with FFT circuitry 142 and digital filters 144 that are associated with a signal path that is turned off. This may allow digital signal processing circuitry 112 to significantly reduce its power consumption by performing operations less processing operations.

In some embodiments, receive capability change circuitry 152 may refrain from changing the receiver capability when the current channel utilization does not exceed the upper channel utilization threshold and when the current channel utilization is not below the lower channel utilization threshold. In some embodiments, data rate selection circuitry 126 may select either an increased or decreased receive data rate in an increment based on predetermined levels, such as data-rate levels of a wireless communication standard. For example, in some embodiments, data rate selection circuitry 126 may select data rates based on particular communication standards, such as 6-Mbps for a WLAN standard. The increased or decreased receive data rate may be no greater than the changed receiver capability.

In some embodiments, multicarrier receiver 100 may also comprise station manager 150. Station manager 150 may notify a transmitting station when the receiver's capability is changed. Station manager 150 may also notify the transmitting station of the selected receive data rate and either a changed number of antennas or a changed channel bandwidth. The number of antennas corresponds to a maximum number of spatial data streams that should be transmitted by the transmitting station.

In some embodiments when the receiver capability is to be increased, after receiver capability change circuitry 152 increases the receiver capability, receiver 100 may receive multicarrier communication signals at the selected receive data rate with either the increased number of antennas or within the increased channel bandwidth. In some embodiments when the receiver capability is to be decreased, after station manager 150 notifies the transmitting station, receiver capability change circuitry 152 may wait a period of time before decreasing the receiver capability. Prior to or after the change in capability, receiver 100 may receive multicarrier communication signals at the selected receive data rate with either the decreased number of antennas or within the decreased channel bandwidth.

In some embodiments, when the receiver capability is to be increased, station manger 150 may notify the transmitting station within an acknowledgement packet or other control packet that may be sent to the transmitting station. In some embodiments, when the receiver capability is to be decreased, station manager 150 may notify the transmitting station by sending one or more broadcast or unicast packets for receipt by one or more transmitting stations. The packets may indicate the selected receiver data rate and either a changed number of antennas or a changed channel bandwidth. In some cases, receiver capability change circuitry 152 may delay the changing for at least a predetermined period of time after transmission of the one or more packets.

The number of antennas that is used may correspond to a maximum number of spatial data streams that can be received. In some embodiments, the maximum number of spatial channels (i.e., independent or separate data streams) that a receiving station (e.g., receiver 100) can properly decode corresponds to the number of receive antennas being used. Accordingly, when a receiving station plans to decrease the number of antennas that is using for receiving, the transmitting station may have to reduce the number of spatial channels it is employing to transmit data prior to the implementation of these changes by the receiving station. On the other hand, when the receiving station plans to increase the number of antennas it is using for receiving, the transmitting station does not have to change the number of spatial channels it is using to transmit data, and the receiving station does not need to notify the transmitting station prior to implementing these changes.

Signal-path front-end circuitry 132 may receive multicarrier communication signals comprising multicarrier packets (e.g., OFDM symbols) through the communication channel at the selected data rate and with the changed number of antennas.

Signal-path front-end circuitry 132 may receive the multicarrier communication signals after signal path selection circuitry 128 has changed the number of antennas used and after station manager notifies the transmitting station. When receiver capability change circuitry 152 either increases the data rate or the number of receive antennas, station manger 150 may notify the transmitting station including the new data rate and number of receive antennas within a control or acknowledgement packet sent to the transmitting station. In some embodiments, the new data rate and number of receive antennas may be transported in a control packet or piggybacked to an acknowledgement packet. When either the data rate or the number of receive antennas is to be decreased, station manger 150 may notify the transmitting station with one or more unicast or broadcast packets for receipt by one or more transmitting stations. The one or more unicast or broadcast packets may indicate the new data rate and number of receive antennas to the one or more transmitting stations. In some embodiments, receiver capability change circuitry 152 may delay the receiver's operation at the decreased data rate or with the decreasing number of antennas for at least a predetermined period of time after transmission of the one or more unicast or broadcast packets.

In some embodiments, channel utilization determining circuitry 120 may measure the current channel utilization by carrier sensing. In some embodiments, the channel utilization may be based on a percent of time that a carrier signal is sensed or based on the level of signal power estimation signal 133. In some embodiments, the channel utilization may be based on an automatic gain control signal level, although the scope of the invention is not limited in this respect.

In some embodiments, header decoder 118 may decode packet headers from received packets, and channel utilization determining circuitry 120 may measure the current channel utilization from packet lengths indicated by the decoded packet headers 119 received thorough the communication channel. In these embodiments, the length of packets and the time between packets may indicate the channel utilization. It should be noted that in these embodiments, multicarrier receiver 100 may process all packets received through the channel, whether or not the packet is intended for this particular receiving station. Accordingly, the channel utilization is independent of whether multicarrier receiver 100 is utilizing the channel, or whether or not other stations are using the communication channel.

In some embodiments, the current channel utilization may be received from another communication station. In these embodiments, the current channel utilization may be measured by the other communication station and may be communicated to multicarrier receiver 100 as part of a request packet or data packet. In some embodiments, multicarrier receiver may request the current channel utilization from another communication station and the requested channel utilization information may be included within frames that are exchanged between the stations, although the scope of the invention is not limited in this respect.

Channel bandwidth selection circuitry 130 may change a receive channel bandwidth based on the channel utilization. In these embodiments, station manager 150 may notify a transmitting station of the changed receive channel bandwidth. Channel bandwidth selection circuitry 130 may select a receive data rate to coincide with a receiver's capability at the changed receive channel bandwidth, although the scope of the invention is not limited in this respect. Examples of channel bandwidths are discussed in more detail below.

In some embodiments, channel bandwidth selection circuitry 130 may also change a sampling rate of one or more of ADCs 110 based on the selected data rate, and may also change LO frequency 115 based on the channel bandwidth to be received. These changes may apply to circuitry of an active signal path. In some embodiments, the sampling rate may be the Nyquist sampling rate based on the bandwidth of the selected data rate. A reduction in the sampling rate of an ADC may result in a significant reducing in power consumption.

In some embodiments, the number of antennas and the receiver channel bandwidth may be changed independently based on a selected receive data rate. When the number of antennas cannot be reduced any further (i.e., only one antenna is operating), the channel bandwidth may be reduced by channel bandwidth selection circuitry 130.

Although multicarrier receiver 100 is illustrated as having several separate functional elements, one or more of the functional elements may be combined and may be implemented by combinations of software-configured elements, such as processing elements including digital signal processors (DSPs), and/or other hardware elements. For example, elements that operate on digital signals may comprise one or more microprocessors, DSPs, application specific integrated circuits (ASICs), and combinations of various hardware and logic circuitry for performing at least the functions described herein.

In some embodiments, multicarrier receiver 100 may be part of a wireless communication device and may receive multicarrier communication signals, such as orthogonal frequency division multiplexed (e.g., OFDM) communication signals. In some embodiments, multicarrier receiver 100 may receive an OFDM packet on a wideband communication channel. The wideband channel may comprise one or more multicarrier communication channels. A multicarrier communication channel may be frequency-division multiplexed (i.e., separated in frequency from other channels) and may be within a predetermined frequency spectrum. In some embodiments, a multicarrier communication channel may have a bandwidth of approximately 20-MHz, and a wideband channel may have a bandwidth in channel increments. For example, a wideband channel may have a bandwidth of approximately 40-MHz, 60-MHz, or 80-MHz. In these embodiments, channel bandwidth selection circuitry 130 may change the operation of receiver 100 to one or more multicarrier communication channels having bandwidths of approximately 20-MHz.

The multicarrier communication channels may comprise a plurality of orthogonal subcarriers. In some embodiments, the orthogonal subcarriers of a subchannel may be closely spaced OFDM subcarriers. To achieve orthogonality between closely spaced subcarriers, in some embodiments, the subcarriers of a particular channel may have a null at substantially a center frequency of the other subcarriers of that channel.

In some embodiments, a multicarrier communication channel may include one or more spatial channels. Spatial channels may be non-orthogonal channels (i.e., not separated in frequency) associated with a particular subchannel in which orthogonality may be achieved through antenna diversity. The use of spatial channels may allow the communication of additional data streams without an increase in channel bandwidth.

In some embodiments, the frequency spectrums for a communication channel may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

In some embodiments, multicarrier receiver 100 may be part of a wireless communication device such as personal digital assistant (PDA), a laptop or portable computer with wireless communication capability, a web tablet, a mobile telephone, a wireless headset, a pager, an instant messaging device, a digital camera, an access point, a network interface card (NIC) or other device that may receive and/or transmit information wirelessly. In some embodiments, multicarrier receiver 100 may receive radio-frequency (RF) communications in accordance with specific communication standards, such as the Institute of Electrical and Electronics Engineers (IEEE) standards including IEEE 802.11(a), 802.11(b), 802.11(g/h) and/or 802.11 (n) standards for wireless local area networks (WLANs) and/or 802.16 standards for wireless metropolitan area networks (WMANs), although multicarrier receiver 100 may also be suitable for receiving communications in accordance with other techniques including the High performance radio Local Area Network (HiperLAN) standard.

Antennas 102 may comprise directional or substantially omnidirectional antennas, including, for example, dipole antennas, monopole antennas, loop antennas, microstrip antennas, patch antennas, or other types of antennas suitable for reception by multicarrier receiver 100.

Although some embodiments of the present invention are discussed in the context of an IEEE 802.11 implementation (e.g., 802.11a, 802.11g, 802.11n, etc.), the scope of the present invention is not limited in this respect. Some embodiments of the present invention may be implemented as part of any wireless system using multicarrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

Figure 2:
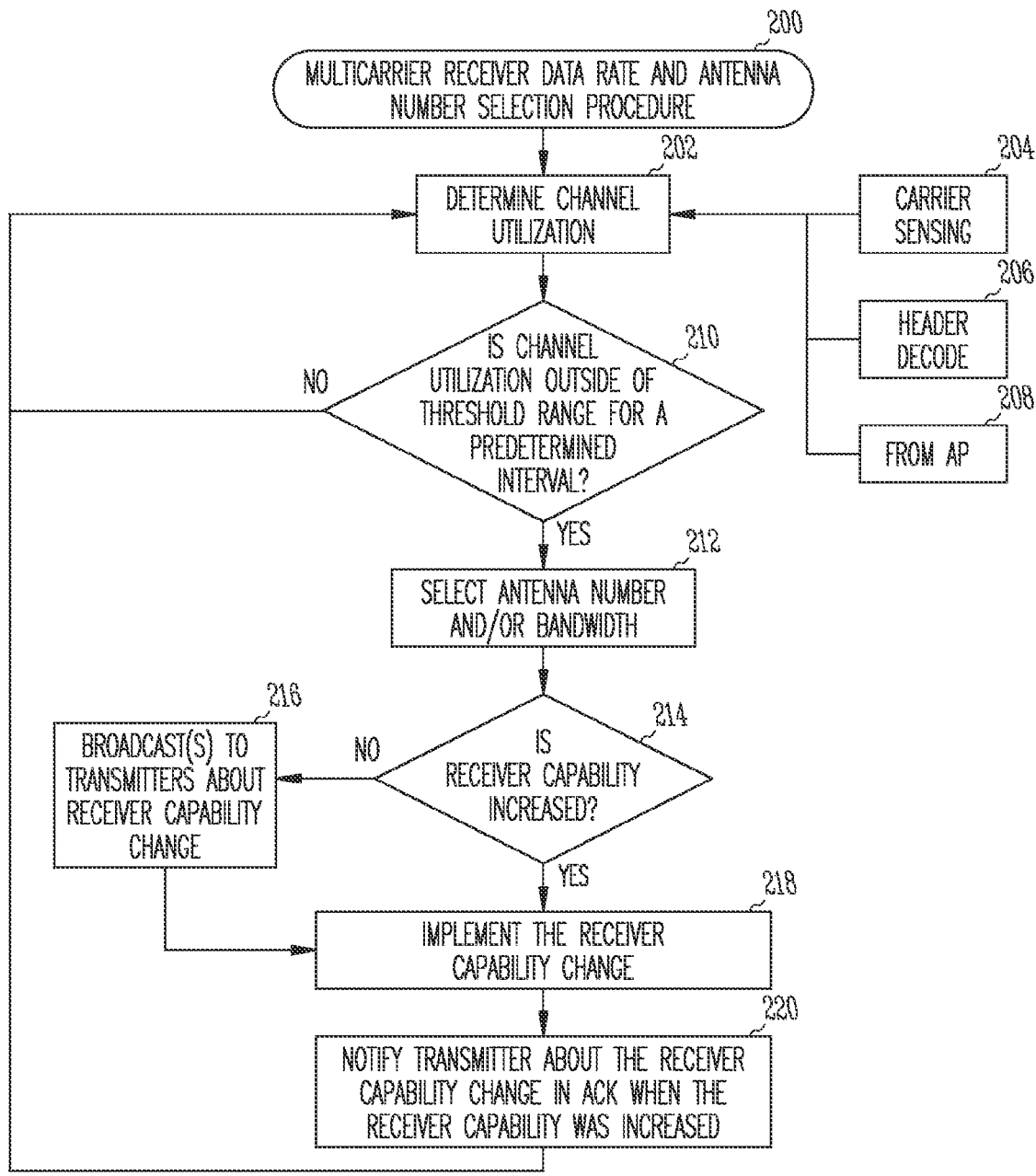
FIG. 2 is a flow chart of a data rate and antenna number selection procedure in accordance with some embodiments of the present invention.

FIG. 2 is a flow chart of a data rate and antenna number selection procedure in accordance with some embodiments of the present invention. Procedure 200 may be performed by a multicarrier receiver, such as multicarrier receiver 100 (FIG. 1), to change a receiver capability based on the utilization of the channel, and to select a receive data rate based on the changed receiver capability. The changed receiver capability may include changing a number of antennas to use to receive multicarrier communications through a communication channel and/or changing the channel bandwidth. In this way, for channels with low utilization, a receiver may select a lower reception capability which may result in reduced power consumption without a reduction in application performance at the receiver or the transmitter. On the other hand for channels with high utilization (i.e., busy channels), a receiver may select a higher reception capability and may receive signals with a higher data rate and/or through additional antennas. This may help meet performance demands of applications at both the receiving station (i.e., the receiver) and the transmitting station.

Operation 202 comprises determining a current channel utilization. The current channel utilization may be determined based carrier sense 204, based on packet length information from header decoding 206, or based on channel utilization information that may provided from a transmitting station, such as an access point (AP) 208.

Operation 210 determines whether the current channel utilization is outside the range of channel utilization thresholds. In some embodiments, operation 210 may determine when the current channel utilization exceeds an upper channel utilization threshold for at least a predetermined period of time, and may also determine when the current channel utilization falls below a lower channel utilization threshold for at least the predetermined period of time. When the channel utilization has either not exceeded the upper channel utilization threshold or not fallen below the lower channel utilization threshold for a least the predetermined period of time, operation 202 may be repeated for subsequent time intervals.

Operation 212 comprises changing the receiver's capability when the channel utilization has either exceeded the upper channel utilization threshold for at least a predetermined period of time, or has fallen below the lower channel utilization threshold for at least the predetermined period of time. The receiver's capability may be changed by changing the number of antennas used for receiving and/or changing the bandwidth of the signals that the receiver processes. Operation 212 also comprises selecting a new data rate based on the changed receiver capability. In some embodiments, the new data rate may be selected from predetermined communication data rates for a particular wireless communication standard, although the scope of the invention is not limited in this respect. In some embodiments, the number of antennas may be selected based on the current channel utilization, and a data rate may be selected based on the observation of the channel through the selected antennas.

Operation 214 comprises determining whether the receiver capability has been increased or decreased in operation 212. When the receiver capability is to be decreased, operation 216 is performed followed directly by operation 218. When the receiver capability is to be increased, operation 218 is performed without the performance of operation 216.

Operation 216 notifies one or more transmitting stations of the changed capability by sending one or more unicast or broadcast packets for receipt by one or more transmitting stations. The one or more packets may indicate the selected receiver data rate including either a changed number of antennas or a changed channel bandwidth. This may allow the receiver to delay changing operating at the decreased receiver capability until after transmission of the one or more packets.

Operation 218 comprises implementing the changed capability in the receiver. When the number of antennas is to be changed from operation 212, operation 214 may comprise turning on or turning off signal-path front-end circuitry 132 (FIG. 1) associated with the one or more changed number of antennas. When the channel bandwidth is to be changed from operation 212, operation 218 may comprise changing a sampling rate of analog-to-digital converters 110 (FIG. 1) based on the changed channel bandwidth, and changing a local oscillator frequency 115 (FIG. 1) based on the changed received channel bandwidth.

Operation 220 comprises notifying one or more transmitting stations of the receiver's change in capability when the receiver's capability is increased. The notification may be included (or piggybacked) in an acknowledge packet to a particular one or more transmitting stations when the receiver's capability is increased.

Although the individual operations of procedure 200 are illustrated and described as separate operations, one or more of the individual operations may be performed concurrently, and nothing requires that the operations be performed in the order illustrated.

Figure 3A:
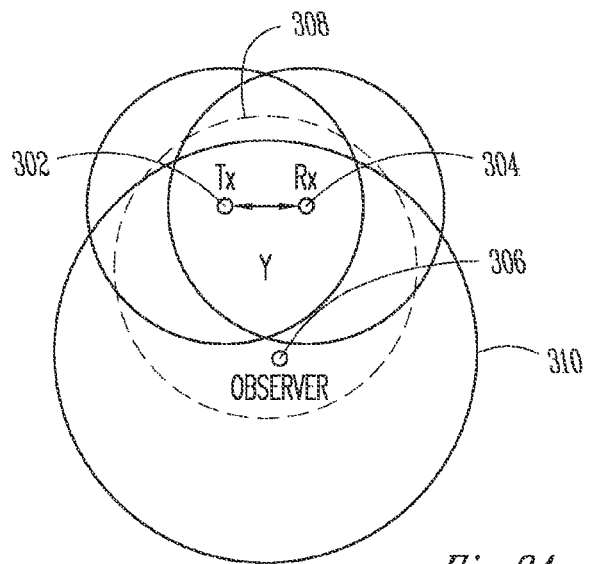
FIGS. 3A and 3B illustrate channel utilization estimation in accordance with some embodiments of the present invention.
Figure 3B:
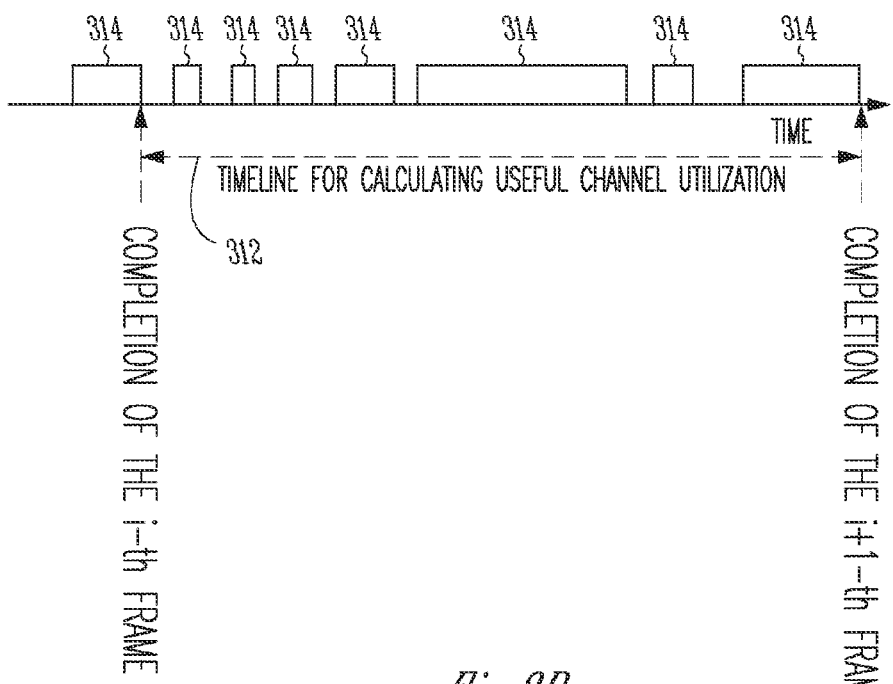

FIGS. 3A and 3B illustrate channel utilization estimation in accordance with some embodiments of the present invention. FIG. 3A illustrates transmitting station 302, receiving station 304 and observing station 306 within a communication cell 308. Observing station 306 may measure current channel utilization within carrier sensing zone 310, which may include communications between stations 302 & 304.

FIG. 3B illustrates a time line that may be used for measuring channel utilization by observing station 306 in accordance with some embodiments of the present invention. Time line 312 illustrates busy periods 314 in which the channel is being used (i.e., carrier sense may be high) within a predetermined period of time or time-interval. In some embodiments, the channel utilization u(i) may be observed by a station immediately after the ith frame destined to and received by the station. In some embodiments, the channel utilization may be a percentage of time that the channel is utilized for transmission in a specific time interval. In some embodiments, the channel utilization may be either measured or estimated from a number of either busy periods 314 or between the two successful transmissions detected between stations with this station as a receiver and the destination.

In some embodiments, an access point may continually collect channel statistics, including both successful and failed transmissions and may report the collected statistics to communication stations upon request. In some embodiments, during an interval between two successful and successive frame receptions of a station, the station may sniff the channel and count the total transmission durations (i.e., busy periods), successful or not, by carrier sensing, and may calculate the channel utilization as the sum of the busy periods divided by the interval length, although the scope of the invention is not limited in this respect. In some embodiments, the upper channel utilization threshold may be set to a predetermined value, such as about 60%, and the lower channel utilization threshold may be set to a predetermined value, such as about 30%, although the scope of the invention is not limited in this respect.

In some embodiments, the predetermined period of time that multicarrier receiver 100 (FIG. 1) may wait may include overhead time needed to increase or decrease the receive data rate to a next higher or next lower rate from a current receive data rate. In some embodiments, the predetermined period of time may include a time to turn on an antenna or increase a channel bandwidth (e.g., from 20 MHz to 40 MHz). In some embodiments, the predetermined period of time may be about 200 milliseconds, although the scope of the invention is not limited in this respect. In some embodiments, the predetermined period of time may include a physical switching delay.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Some embodiments of the invention may be implemented in one or a combination of hardware, firmware and software. Some embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A method performed by a multicarrier receiver comprising:
   determining a current channel utilization of a communication channel;
   changing a receiver capability based on the current channel utilization;
   selecting a receive data rate based on the receiver capability; and
   notifying a transmitting station when the receiver capability has been changed to allow the transmitting station to change either its spatial channel transmission configuration or its transmission bandwidth
   wherein changing the receiver capability includes one or more of reducing a number of antennas used to receive multicarrier communication signals and reducing a channel bandwidth when the current channel utilization is below a lower channel utilization threshold,
   wherein reducing the number of antennas comprises turning off signal-path circuitry associated with one or more of the antennas, wherein reducing the channel bandwidth comprises changing a receive channel bandwidth to a narrowband channel from a wideband channel, the wideband channel having at least twice the frequency bandwidth of the narrowband channel and comprises two or more narrowband channels, wherein notifying includes notifying the transmitting station that either the number of antennas used by the receiver has been changed or that the receive-channel bandwidth used by the receiver has been changed, wherein changing the receiver capability includes one or more of increasing the number of antennas used to receive the multicarrier communication signals and increasing the channel bandwidth when the current channel utilization exceeds an upper channel utilization threshold, wherein increasing the channel bandwidth comprises changing the receive channel bandwidth to the wideband channel from the narrowband channel, wherein increasing the number of antennas comprises turning on signal-path circuitry associated with one or more of the antennas, wherein turning off the signal-path circuitry associated with one or more of the antennas reduces power consumption of the multicarrier receiver, wherein the two or more narrowband channels that comprise the wideband channel utilize different sets of OFDM subcarriers, wherein the multicarrier receiver is configured to operate in accordance with an IEEE 802.11(n) wireless communication standard, wherein the narrowband channel has a bandwidth of 20 MHz, and wherein the wideband channel has a bandwidth of at least 40 MHz.

2. The method of claim 1 further comprising verifying that the current channel utilization either exceeds the upper channel utilization threshold or falls below the lower channel utilization threshold for at least a predetermined period of time before changing the receiver capability.

3. The method of claim 1 further comprising refraining from changing the receiver capability when the current channel utilization does not exceed the upper channel utilization threshold and when the current channel utilization is not below the lower channel utilization threshold.

4. A method performed by a multicarrier receiver comprising:

determining a current channel utilization of a communication channel;

changing a receiver capability based on the current channel utilization;

selecting a receive data rate based on the receiver capability; and notifying a transmitting station when the receiver capability has been changed to allow the transmitting station to change either its spatial channel transmission configuration or its transmission bandwidth, wherein changing the receiver capability includes one or more of reducing a number of antennas used to receive multicarrier communication signals and reducing a channel bandwidth when the current channel utilization is below a lower channel utilization threshold, wherein reducing the number of antennas comprises turning off signal-path circuitry associated with one or more of the antennas, wherein reducing the channel bandwidth comprises changing a receive channel bandwidth to a narrowband channel from a wideband channel, the wideband channel having at least twice the frequency bandwidth of the narrowband channel and comprises two or more narrowband channels, wherein changing the receiver capability includes one or more of increasing the number of antennas used to receive the multicarrier communication signals and increasing the channel bandwidth when the current channel utilization exceeds an upper channel utilization threshold, wherein increasing the channel bandwidth comprises changing the receive channel bandwidth to the wideband channel from the narrowband channel, wherein increasing the number of antennas comprises turning on signal-path circuitry associated with one or more of the antennas, wherein notifying includes notifying the transmitting station that either the number of antennas used by the receiver has been changed or that the receive-channel bandwidth used by the receiver has been changed when the receiver capability is changed, wherein turning off the signal-path circuitry associated with one or more of the antennas reduces power consumption of the multicarrier receiver, wherein the two or more narrowband channels that comprise the wideband channel utilize different sets of OFDM subcarriers, wherein the multicarrier receiver is configured to operate in accordance with an IEEE 802.11(n) wireless communication standard, wherein the narrowband channel has a bandwidth of 20 MHz, and wherein the wideband channel has a bandwidth of at least 40 MHz, wherein selecting comprises selecting either an increased or decreased receive data rate in an increment based on predetermined levels of the IEEE 802.11(n) wireless communication standard, and wherein the increased or decreased receive data rate is no greater than the changed receiver capability.

5. The method of claim 1 wherein the notifying includes:
notifying the transmitting station of the selected receive data rate;
wherein the number of antennas correspond to a maximum number of spatial data streams to be received.

6. The method of claim 1 further comprising:
comparing the current channel utilization to one or more channel utilization thresholds.

7. The method of claim 1 further comprising measuring the current channel utilization by carrier sensing.

8. The method of claim 1 further comprising measuring the current channel utilization from packet lengths indicated by decoded headers of packets received thorough the communication channel.

9. A multicarrier receiver comprising:
channel utilization determining circuitry to determine a current channel utilization of a communication channel;
receiver capability change circuitry to change a receiver capability of the receiver based on the current channel utilization;
a station manager to notify a transmitting station when the receiver capability is changed to allow the transmitting station to change either its spatial channel transmission configuration or its transmission bandwidth; and
data rate selection circuitry to select a receive data rate based on the receiver capability,
wherein the receiver capability change circuitry is configured to change the receiver capability by one or more of reducing a number of antennas used to receive multicarrier communication signals and reducing a channel bandwidth when the current channel utilization is below a lower channel utilization threshold, wherein to reduce the number of antennas, the receiver capability change circuitry is configured to turn off signal-path circuitry associated with one or more of the antennas, and wherein to reduce the channel bandwidth, the receiver capability change circuitry is configured to change a receive channel bandwidth to a narrowband channel from a wideband channel, the wideband channel having at least twice the frequency bandwidth of the narrowband channel and comprises two or more narrowband channels, wherein the receiver capability change circuitry is configured to at least one of increase the number of antennas used to receive the multicarrier communication signals and increase the channel bandwidth when the current channel utilization exceeds an upper channel utilization threshold wherein to increase the channel bandwidth, the receiver capability change circuitry is configured to change the receive channel bandwidth to the wideband channel from the narrowband channel, wherein to increase the number of antennas, the receiver capability change circuitry is configured to turn on signal-path circuitry associated with one or more of the antennas, wherein the station manager notifies the transmitting station that either the number of antennas used by the receiver has been changed or that the receive-channel bandwidth used by the receiver has been changed when the receiver capability is changed, wherein the receiver capability change circuitry is configured to turn off the signal-path circuitry associated with one or more of the antennas to reduce power consumption of the multicarrier receiver, wherein the two or more narrowband channels that comprise the wideband channel utilize different sets of OFDM subcarriers, wherein the multicarrier receiver is configured to operate in accordance with an IEEE 802.11(n) wireless communication standard, and wherein the narrowband channel has a bandwidth of 20 MHz, and wherein the wideband channel has a bandwidth of at least 40 MHz.

10. The receiver of claim 9 wherein the channel utilization determining circuitry is to verify that the current channel utilization either exceeds the upper channel utilization threshold or falls below the lower channel utilization threshold for at least a predetermined period of time before the receiver capability change circuitry changes the receiver capability.

11. The receiver of claim 9 wherein the receive capability change circuitry is to refrain from changing the when the current channel utilization does not exceed the upper channel utilization threshold and when the current channel utilization is not below the lower channel utilization threshold.

12. A multicarrier receiver comprising:
channel utilization determining circuitry to determine a current channel utilization of a communication channel;
receiver capability change circuitry to change a receiver capability of the receiver based on the current channel utilization;
a station manager to notify a transmitting station when the receiver capability is changed to allow the transmitting station to change either its spatial channel transmission configuration or its transmission bandwidth; and data rate selection circuitry to select a receive data rate based on the receiver capability, wherein the receiver capability change circuitry is configured to change the receiver capability by one or more of reducing a number of antennas used to receive multicarrier communication signals and reducing a channel bandwidth when the current channel utilization is below a lower channel utilization threshold, wherein to reduce the number of antennas, the receiver capability change circuitry is configured to turn off signal-path circuitry associated with one or more of the antennas, wherein to reduce the channel bandwidth, the receiver capability change circuitry is configured to change a receive channel bandwidth to a narrowband channel from a wideband channel, the wideband channel having at least twice the frequency bandwidth of the narrowband channel and comprises two or more narrowband channels, wherein the receiver capability change circuitry is configured to at least one of increase the number of antennas used to receive the multicarrier communication signals and increase the channel bandwidth when the current channel utilization exceeds an upper channel utilization threshold, wherein to increase the channel bandwidth, the receiver capability change circuitry is configured to change the receive channel bandwidth to the wideband channel from the narrowband channel, wherein to increase the number of antennas, the receiver capability change circuitry is configured to turn on signal-path circuitry associated with one or more of the antennas, wherein the station manager notifies the transmitting station that either the number of antennas used by the receiver has been changed or that the receive-channel bandwidth used by the receiver has been changed when the receiver capability is changed when the receiver capability is changed, wherein the receiver capability change circuitry is configured to turn off the signal-path circuitry associated with one or more of the antennas to reduce power consumption of the multicarrier receiver, wherein the two or more narrowband channels that comprise the wideband channel utilize different sets of OFDM subcarriers, wherein the multicarrier receiver is configured to operate in accordance with an IEEE 802.11(n) wireless communication standard, wherein the narrowband channel has a bandwidth of 20 MHz, and wherein the wideband channel has a bandwidth of at least 40 MHz, wherein the data rate selection circuitry is to select either an increased or decreased receive data rate in an increment based on predetermined levels of the IEEE 802.11(n) wireless communication standard, and wherein the increased or decreased receive data rate is no greater than the changed receiver capability.

13. The receiver of claim 9 wherein the station manager is to notify the transmitting station of the selected receive data rate, wherein the number of antennas corresponds to a maximum number of spatial data streams to be received.

14. The receiver of claim 9 further comprising threshold comparison circuitry to compare the current channel utilization to one or more channel utilization thresholds, wherein the receiver capability change circuitry is to turn off signal-path circuitry associated with one of the antennas when the current channel utilization is below one of the channel utilization thresholds.

15. The receiver of claim 9 wherein the channel utilization determining circuitry is to measure the current channel utilization by carrier sensing.

16. The receiver of claim 9 further comprising a header decoder to decode packet headers from received packets, and wherein the channel utilization determining circuitry is to measure the current channel utilization from packet lengths indicated by the decoded headers.

17. The receiver of claim 9 wherein the channel utilization determining circuitry is to receive the current channel utilization from another communication station, the current channel utilization having been measured by the other communication station.

* * * * *

UNITED STATES PATENT AND TRADEMARK OFFICE
CERTIFICATE OF CORRECTION

PATENT NO.        : 8,019,303 B2
APPLICATION NO.   : 10/954019
DATED             : September 13, 2011
INVENTOR(S)       : Changwen Liu et al.

Page 1 of 1

It is certified that error appears in the above-identified patent and that said Letters Patent is hereby corrected as shown below:

In column 12, line 51, in Claim 8, delete "thorough" and insert -- through --, therefor.

In column 13, line 54, in Claim 11, delete "the when the" and insert -- when the --, therefor.

In column 14, line 39-40, in Claim 12, delete "changed when the receiver capability is changed," and insert -- changed, --, therefor.

Signed and Sealed this
Eighth Day of November, 2011

David J. Kappos
*Director of the United States Patent and Trademark Office*